United States Patent
Hsu et al.

(10) Patent No.: US 10,268,184 B2
(45) Date of Patent: Apr. 23, 2019

(54) APPARATUS AND METHOD FOR TRANSFORMING NC PROGRAMS

(71) Applicant: Industrial Technology Research Institute, Chu-Tung, Hsinchu (TW)

(72) Inventors: Chih-Yuan Hsu, Kaohsiung (TW); Jui-Ming Chang, Taichung (TW); Shuo-Peng Liang, Taichung (TW); Tzuo-Liang Luo, Taichung (TW); Ta-Jen Peng, Taichung (TW); Jen-Ji Wang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 117 days.

(21) Appl. No.: 14/757,481

(22) Filed: Dec. 23, 2015

(65) Prior Publication Data

US 2017/0123402 A1 May 4, 2017

(30) Foreign Application Priority Data

Oct. 30, 2015 (TW) .............................. 104135774 A

(51) Int. Cl.
*G05B 19/416* (2006.01)

(52) U.S. Cl.
CPC .................... *G05B 19/4163* (2013.01); *G05B 2219/36086* (2013.01)

(58) Field of Classification Search
CPC ................ G05B 19/41; G05B 139/402; G05B 2219/36086; G05B 2219/36082;
(Continued)

(56) References Cited

U.S. PATENT DOCUMENTS 4,020,331 A * 4/1977 Kimura ................. G05B 19/416 318/571
5,387,852 A 2/1995 Maida et al.
(Continued)

FOREIGN PATENT DOCUMENTS

CN 101794140 A 8/2010
CN 101206467 9/2010
(Continued)

OTHER PUBLICATIONS

Makoto Yoshida, Compressing Method for Working Shape Data of Shape Working System, Oct. 20, 2003, Machine Translation of Japanese Patent (JP 3459155).*
(Continued)

*Primary Examiner* — Robert E Fennema
*Assistant Examiner* — Christopher W Carter
(74) *Attorney, Agent, or Firm* — Muncy, Geissler, Olds & Lowe, P.C.

(57) ABSTRACT

An apparatus and method for transforming NC programs are provided, and the apparatus is electrically connected to a controller configured to, according to a NC program, command a machine to drive a cutting tool to cut a workpiece. The apparatus includes a triggering module, a coordinate position processing module, and a storage module. The triggering module is electrically connected to the controller. The coordinate position processing module is electrically connected to the controller and the triggering module. The storage module is electrically connected to the coordinate position processing module. The triggering module triggers the controller to execute the NC program in a single block mode. The coordinate position processing module is triggered by the triggering module to acquire at least one coordinate position from the controller. The storage module stores the at least one coordinate position. The triggering module simultaneously triggers the controller and the coordinate position processing module.

14 Claims, 11 Drawing Sheets

(58) Field of Classification Search
CPC ........... G05B 2219/35066; G05B 2219/15065;
G05B 2219/32216; G05B 2219/34325;
G05B 2219/1166; G05B 2219/23302
USPC ........................................................ 700/159
See application file for complete search history.

(56) References Cited

U.S. PATENT DOCUMENTS

| | | | |
|---|---|---|---|
| 6,157,869 | A | 12/2000 | Matsumura et al. |
| 6,678,575 | B1 | 1/2004 | Graham et al. |
| 6,834,214 | B2 | 12/2004 | Davison et al. |
| 8,970,156 | B2 | 3/2015 | Tezuka et al. |
| 2004/0236462 | A1 | 11/2004 | Takeshita et al. |
| 2008/0249653 | A1* | 10/2008 | Ichikawa ............ G05B 19/4155 700/189 |
| 2013/0253694 | A1 | 9/2013 | Chung et al. |
| 2015/0032247 | A1* | 1/2015 | Hashizume ......... G05B 19/4063 700/159 |
| 2016/0054727 | A1* | 2/2016 | Kageyama ......... G05B 19/4103 700/188 |

FOREIGN PATENT DOCUMENTS

| | | | |
|---|---|---|---|
| CN | 103930240 | A | 7/2014 |
| CN | 104272205 | A | 1/2015 |
| EP | 0270679 | A1 | 6/1988 |
| JP | H1049215 | A | 2/1998 |
| JP | 3459155 | B2 * | 10/2003 ............ B23Q 15/00 |
| TW | 475911 | | 2/2002 |
| TW | I333134 | | 5/2008 |
| TW | 201400997 | | 1/2014 |
| TW | 201510686 | | 3/2015 |

OTHER PUBLICATIONS

Chang, "Investigation of the Optimal feed rate for high speed machining", Department of Creative Product Design, De Lin Institute of Technology, Jan. 2014, 20 pages.

Liang et al., "The current development of the machine tool intelligent technology", Journal of the Mechatronic Industry, Mar. 2015, 14 pages.

Liang et al., "*Current Status of Intelligent Software for Machine Tools*", Journal of the Mechantronic Industry, Mar. 2015, 14 pages.

* cited by examiner

APPARATUS AND METHOD FOR TRANSFORMING NC PROGRAMS

This non-provisional application claims priority under 35 U.S.C. § 119(a) on Patent Application No(s). 104135774 filed in Taiwan, R.O.C. on Oct. 30, 2015, the entire contents of which are hereby incorporated by reference.

TECHNICAL FIELD

The disclosure relates to an apparatus and method for transforming NC programs.

BACKGROUND

The advance in industrial technology has caused that machine tools are used to machine different workpieces, in order to achieve high manufacturing efficiency. Generally, a mechanism capable of moving along three linear axes can be used to form a three-axis machine tool. Moreover, three linear-axis mechanism and two rotary axis mechanisms can be used to form a five-axis machine tool in order to work out more complicated surface processing or components having a more complicated structure, such as fan blades and engine cylinders. Because the usage of machine tools greatly reduces the time spent in manufacture and increases the manufacture efficiency, machine tools are widely used in the markets.

In practice, although a machine tool can be controlled by a NC program to perform more complicated cutting/peeling process to workpieces, a conventional NC program is used to design the machining path by referring to the engineer's experiences and no information about the cutting/peeling force applied to a cutting tool path can be provided to the engineer for reference. Therefore, such a cutting tool path still has some deficiencies therein, resulting in too much cutting force of the cutting tool. Accordingly, this force may damage the cutter of a cutting tool or may cause a waste of workpieces because damaging them.

Accordingly, users need to additionally write an interpreter and use this interpreter to interpret the cutting tool trace drawn by the NC program, in order to estimate the cutting stress at the junction between the cutting tool and the workpiece and calibrate the machine tool by referring the estimated cutting stress. However, a different brand of machine tool requires an individual interpreter, and this will increase the manufacture costs. Moreover, it is not easy for an interpreter to have a sufficient interpretation ability used to interpret a variety of macroinstructions written by users. Also, modern interpreters can obtain only skeleton cutting tool traces from a NC program but cannot obtain accurate cutting tool traces.

SUMMARY

According to one or more embodiments, the disclosure provides a NC program transformation apparatus electrically connected to a controller configured to execute a NC program. The controller, according to the NC program, commands a machine to drive a cutting tool to cut a workpiece. The NC program transformation apparatus includes a triggering module, a coordinate position processing module, and a storage module. The triggering module electrically connected to the controller. The coordinate position processing module is electrically connected to the controller and the triggering module. The storage module is electrically connected to the coordinate position processing module. The triggering module triggers the controller to execute a NC program in a single block mode. Each block of the NC program commands the cutting tool to move positions corresponding to at least one set of coordinate positions in order. The coordinate position processing module is triggered by the triggering module to acquire at least one coordinate position from the controller. The storage module stores the at least one coordinate position. The triggering module simultaneously triggers the controller and the coordinate position processing module.

According to one or more embodiments, the disclosure provides a NC program transformation method applied to a NC program transformation apparatus electrically connected to a controller configured to execute a NC program to command a machine to drive a cutting tool to cut a workpiece according to the NC program. The NC program transformation method includes the following steps. Trigger the controller to execute the NC program in a single block mode. Each block of the NC program is used to command the cutting tool to move to positions corresponding to at least one set of coordinate positions. Acquire at least one coordinate position from the controller and store the at least one coordinate position. Triggering the controller and acquiring the at least one set of coordinate positions from the controller are triggered at the same time.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 3A is a schematic diagram of coordinate position information of a workpiece acquired by the NC program transformation apparatus with respect to FIG. 2 in an embodiment;

FIG. 3B is a schematic diagram of coordinate position information of a workpiece acquired by a conventional method;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
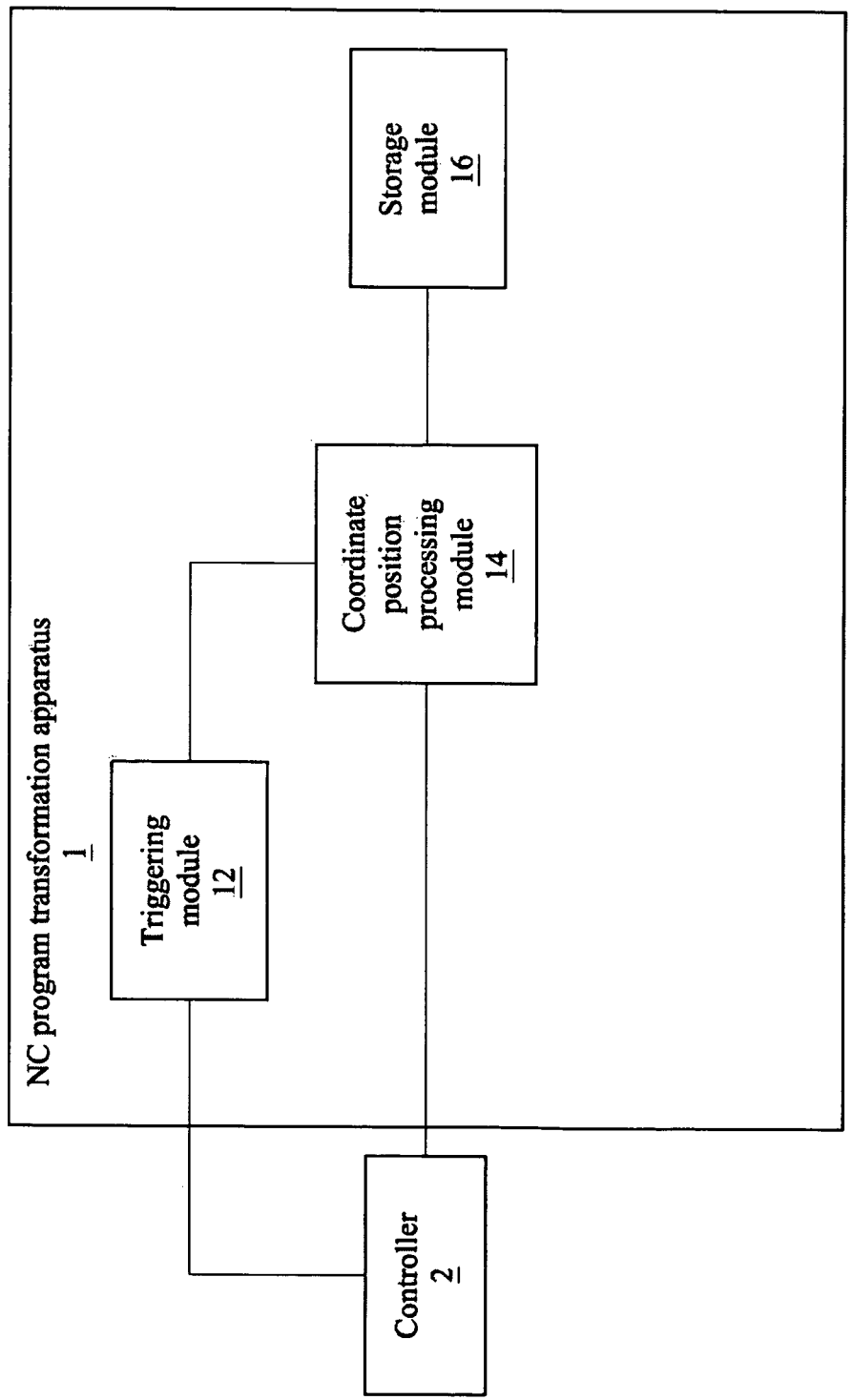
FIG. 1A is a functional block diagram of a NC program transformation apparatus in an embodiment.

Please refer to FIG. 1A. FIG. 1A is a functional block diagram of a NC program transformation apparatus 1 in an embodiment. The NC program transformation apparatus 1 is electrically connected to a controller 2. The controller 2 executes a NC program to command a machine to drive a cutting tool to cut a workpiece. The machine herein is a multi-axis machine tool in this or some embodiments, and the machine uses a spindle and a plurality of feed axes to move the cutting tool in this or some embodiments. The multi-axis machine tool may be any multi-axis machine tool in the art or in the feature, and thus it will not be described in detail hereinafter and be drawn. The controller 2 is, for example, a central control device of a machine tool. The machine is, for example, a machine tool having one or more axes. The NC program is, for example, a numerical control code (NC code). The disclosure will not have any limitation in the type of the cutting tool. The NC program transformation apparatus 1 includes a triggering module 12, a coordinate position processing module 14, and a storage module 16. The triggering module 12 is electrically connected to the controller 2 and the coordinate position processing module 14, and the coordinate position processing module 14 is electrically connected to the controller 2 and the storage module 16.

The triggering module 12 triggers the controller 2 to execute the NC program in a single block mode. Herein, the controller 2 executes the NC program step by step according to the control of the triggering module 12, that is, executes a single one block of the NC program one time rather than the whole of the NC program one time. A different machine may require each block of the NC program to command the cutting tool to move to positions corresponding to at least one set of coordinate positions in order to cut or peel the workpiece in an embodiment, and may further drive the cutting tool to rotate in a spindle speed, turn an angle, or move in a different feed rate in another embodiment. When the controller 2 executes the NC program in the single block mode, the controller 2 generates the spindle speed information, feed rate information of the cutting tool or at least one coordinate position, to which the cutting tool will move, in each block. Each block herein is a code used to command a machine tool to drive a cutting tool or drive a workpiece, and does not belong to any pleonasm line. The coordinate position herein is a coordinate of the workpiece or the cutting tool. A person skilled in the art can directly obtain the trace of the cutting tool according to the coordinate position of the cutting tool or indirectly obtain the trace of the cutting tool by estimating the coordinate position of the workpiece, and the disclosure will not have any limitation thereto. The following description is based on an exemplary embodiment, where the coordinate position processing module 14 acquires the coordinate position of the workpiece from the controller 2, and however, other exemplary embodiments may be contemplated in which the coordinate position processing module 14 can acquire other information.

The triggering module 12 triggers the coordinate position processing module 14 to acquire at least one coordinate position of the workpiece from the controller 2. More particularly, when the triggering module 12 triggers the controller 2 to execute the NC program in the single block mode, the triggering module 12 meanwhile triggers the coordinate position processing module 14 to be synchronous to the time sequence of the NC program executed by the controller 2, and the coordinate position processing module 14 acquires at least one coordinate position of the workpiece from the controller 2 when the controller 2 executes the NC program. In another embodiment, the coordinate position processing module 14 simultaneously acquires the information about the feed rate, spindle speed or block number of the current code of the NC program, generated when the controller 2 executes the NC program. The storage module 16 stores the above acquired information about at least one coordinate position of the workpiece, the feed rate, the block number of the currently-executed code, or the spindle speed.

Figure 1B:
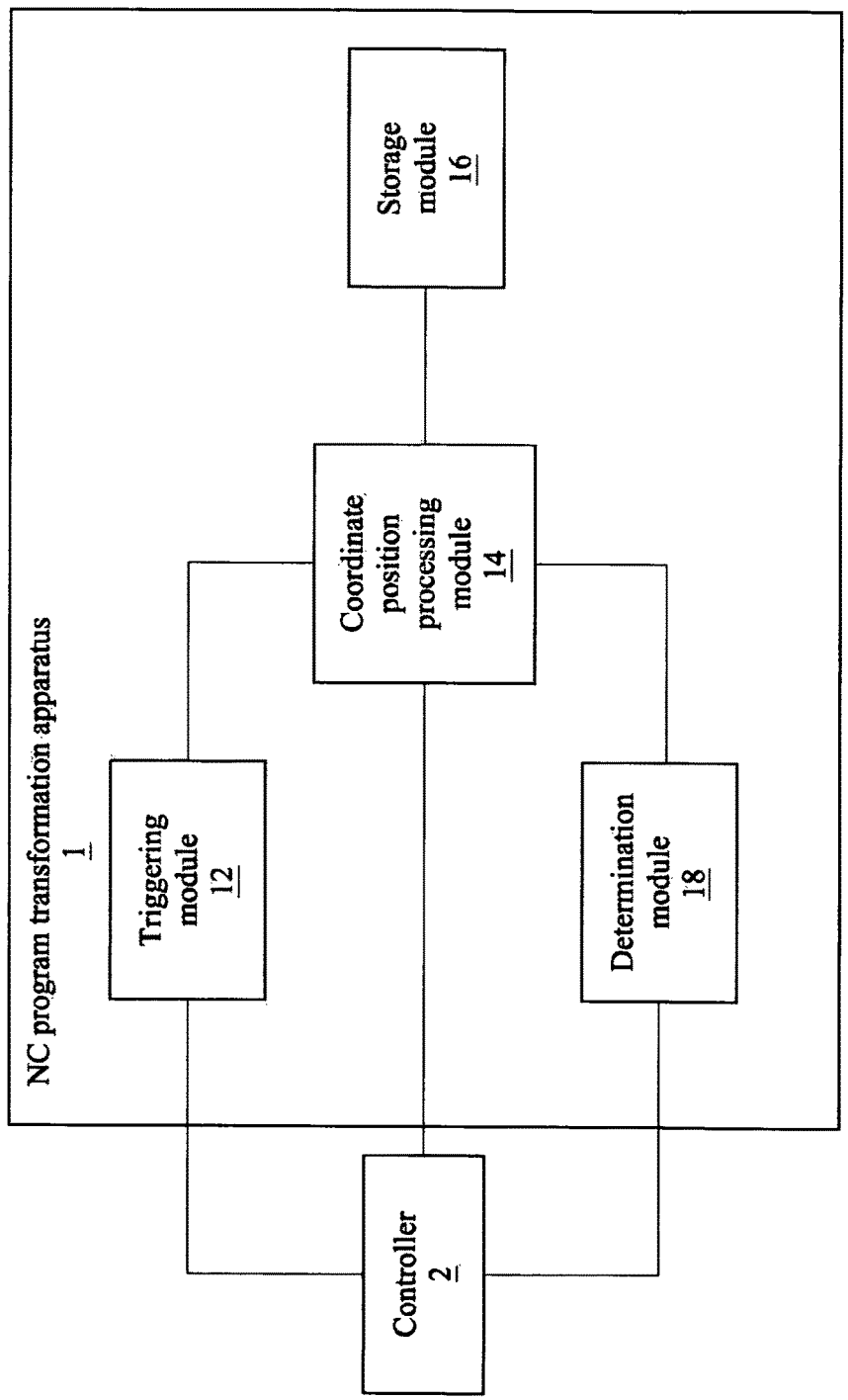
FIG. 1B is a functional block diagram of a NC program transformation apparatus in another embodiment.

Another embodiment of the NC program transformation apparatus may be contemplated with respect FIG. 1B, which is a functional block diagram of a NC program transformation apparatus in another embodiment. The NC program transformation apparatus 1 further includes a determination module 18. The determination module 18 is electrically connected to the controller 2 and the coordinate position processing module 14. The determination module 18, according to the status of the controller 2, commands the coordinate position processing module 14 to acquire at least one coordinate position of the workpiece from the controller 2. Specifically, the controller 2 executes the NC program one block by one block, and after the controller 2 finishes one block or finishes a paragraph of codes, the status of the controller 2 changes. Instances of the status of the controller 2 include temporary idleness. The determination module 18, according to the change in the status of the controller 2, determines whether the controller 2 is performing the NC program, so as to command the coordinate position processing module 14 to be synchronous to the executing time sequence of the controller 2, and command the coordinate position processing module 14 to acquire from the controller 2 the above at least one coordinate position, feed rate information, block number of a single block or spindle speed information.

Figure 2:
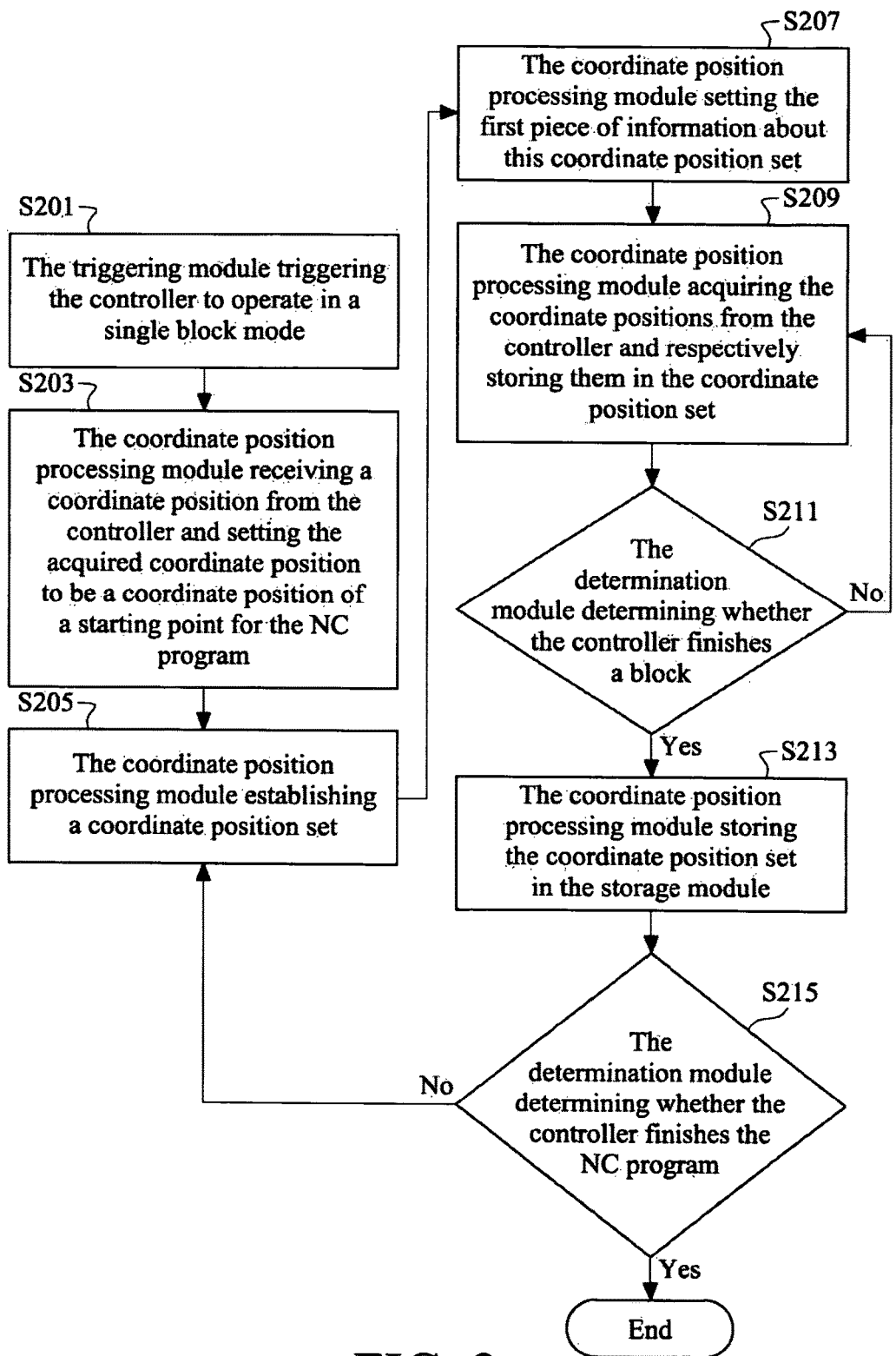
FIG. 2 is a flow chart of a NC program transformation apparatus in an embodiment.

Please refer to FIG. 2 to illustrate the detailed operation of the NC program transformation apparatus. FIG. 2 is a flow chart of a NC program transformation apparatus in an embodiment. As shown in FIG. 2, at the beginning of the manufacturing process, the controller 2 first loads a NC program. Then, in step S201, the triggering module 12 triggers the controller 2 to execute the NC program in a single block mode. In step S203, the coordinate position processing module 14 receives a coordinate position from the controller 2 and sets the firstly-acquired coordinate position to be a coordinate of a starting point of the NC program. In step S205, the coordinate position processing module 14 establishes an empty coordinate position set. In step S207, set the first coordinate position to be the first piece of information about this coordinate position set. Then, in step S209, the coordinate position processing module 14 adds relative information about the received coordinate position in the coordinate position set. In step S211, the determination module 18 determines whether the controller 2 finishes a block. When the controller 2 has not finished this block yet, the coordinate position processing module 14 keeps acquiring the coordinate position and relevant information from the controller 2. When the controller 2 finishes one block, the method proceeds to step S213, where the coordinate position processing module 14 stores the last coordinate position as the last one of the coordinate position set. Then, the method proceeds to step S215, where the determination module 18 determines whether the controller 2 finishes the NC program. When the controller 2 has not finished the NC program yet, the coordinate position processing module 14 establishes another empty coordinate position set and repeats the above process. In an embodiment, the end point of the first coordinate position set is set as the starting point of the second coordinate position set. Although the following description is based on this embodiment, other embodiments may be contemplated.

Figure 3A:
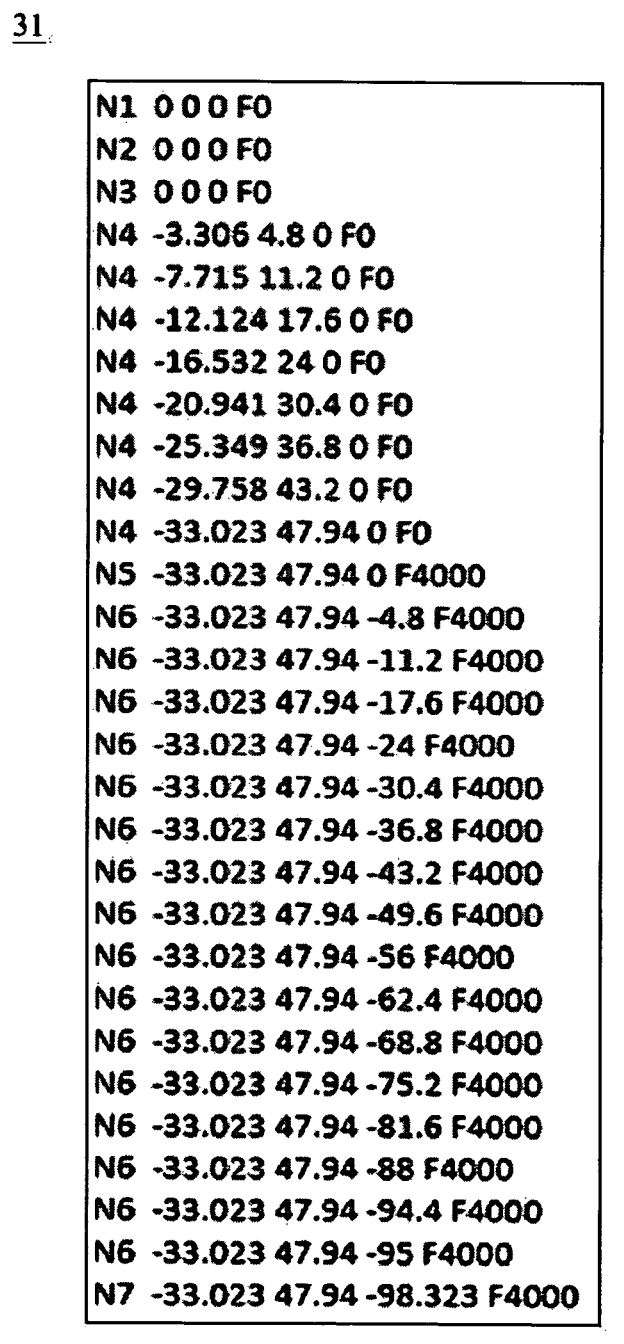
Figure 3B:
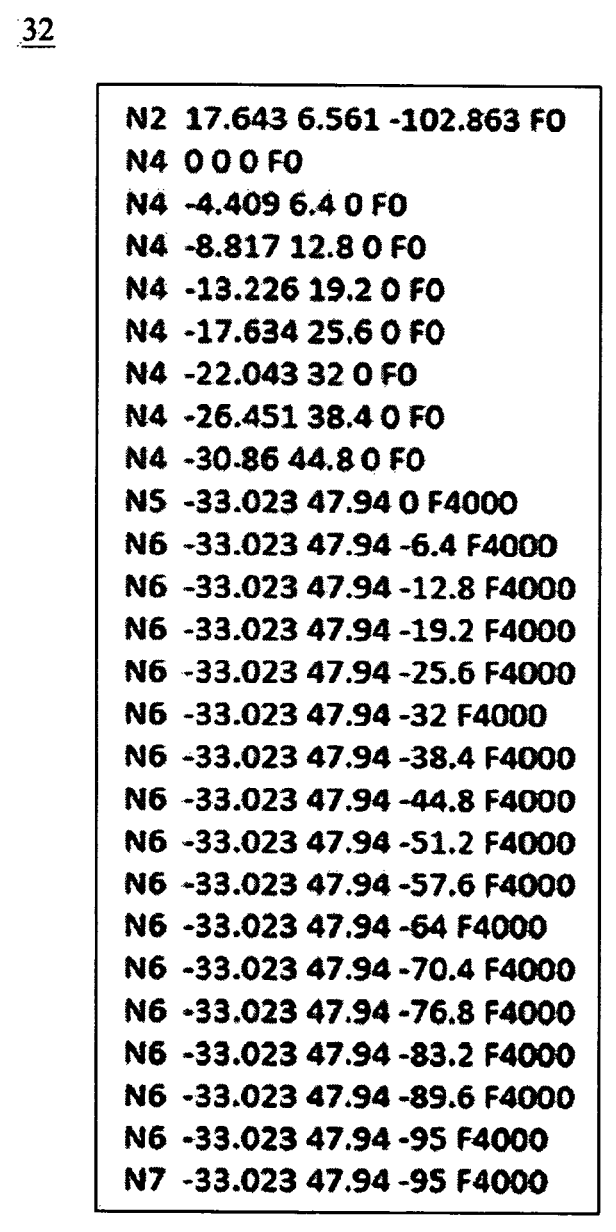

Please refer to FIG. 3A and FIG. 3B. FIG. 3A is a schematic diagram of coordinate position information of a workpiece acquired by the NC program transformation apparatus with respect to FIG. 2 in an embodiment, and FIG. 3B is a schematic diagram of coordinate position information of a workpiece acquired by a conventional method. FIG. 3A presents coordinate position information 31, which is required by the NC program transformation apparatus 1 from the controller 2. FIG. 3B presents coordinate position information 33, which is acquired from the controller 2. N1, N2, N3 and so on in the coordinate position information 31 and 33 are block numbers in the NC program, respectively. Therefore, each block number in the coordinate position information 31 and 33 represents the coordinate position information corresponding to a certain block. For N3 0 0 0 F0 in the third block and N4 −3.306 4.8 0 F0 in the fourth block in the coordinate position information 31, N3 0 0 0 F0 is used to record that the third block of the NC program has made a workpiece move to the positions 0 0 0 in a feed rate F0, and N4 −3.306 4.8 0 F0 is used to record that the fourth block of the NC program has made a workpiece move to the positions −3.306 4.8 0 in the feed rate F0. 0 0 0 in the third block and −3.306 4.8 0 in the fourth block represent coordinate positions at the x, y and z axes, respectively. F0 represents the feed rate. The above description is exemplary, and a person skilled in the art can freely design the format of the coordinate position information and the parameters recited in the coordinate position information in view of the disclosure.

More particularly, whenever the controller 2 executes one block of the NC program, the cutting tool or workpiece may be adjusted more than one time, resulting in more than one piece of coordinate position information. For the same block, when the coordinate position information 31 and 33 are compared with each other, as shown in FIG. 3A and FIG. 3B, the NC program transformation apparatus 1 may acquire more coordinate position information than the conventional way. In other words, a tooling path formed by the coordinate position information acquired by the NC program transformation apparatus 1 may be more accurate than the tooling path obtained in a conventional way.

Figure 4:
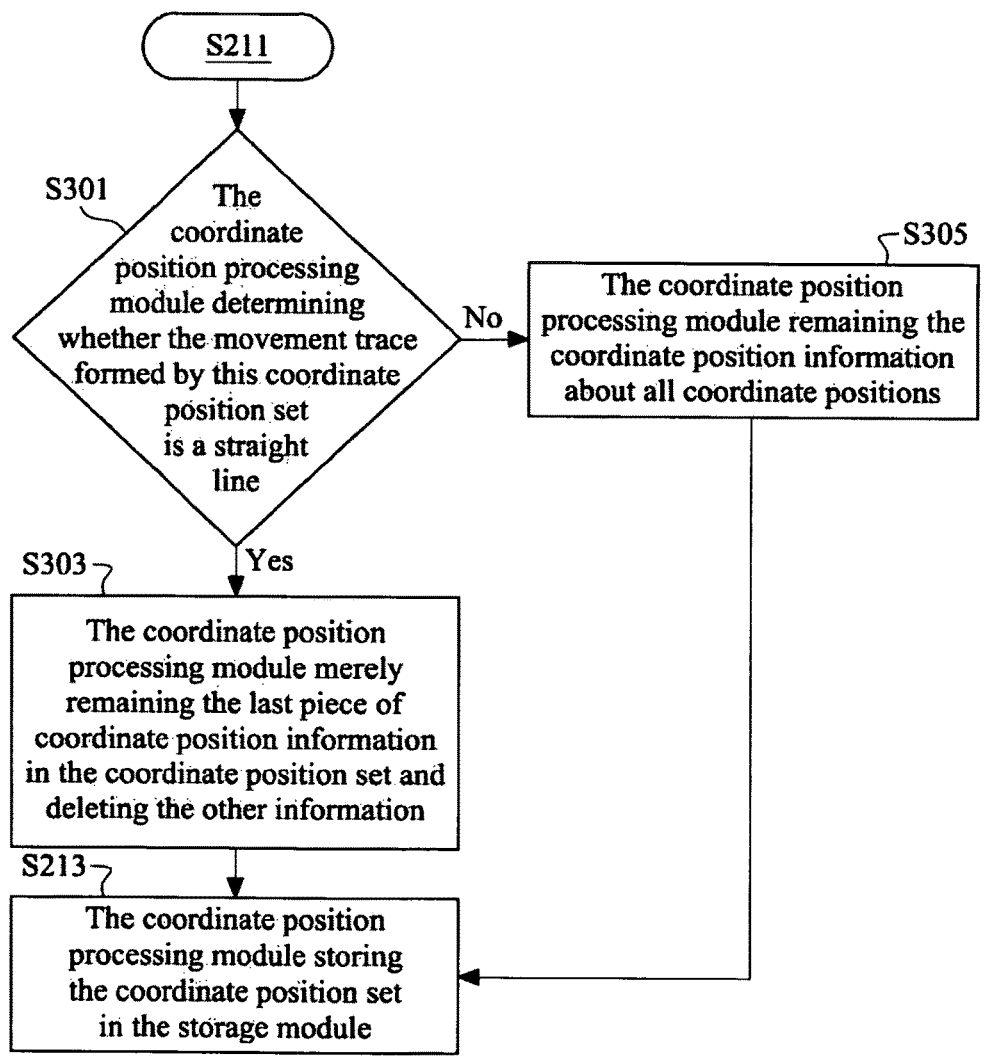
FIG. 4 is a flow chart of determining whether a movement trace is a straight line, by the NC program transformation apparatus in an embodiment.

In addition to the above operation, the NC program transformation apparatus 1 also performs fine-tuning process with respect to FIG. 4. FIG. 4 is a flow chart of determining whether a movement trace is a straight line, by the NC program transformation apparatus in an embodiment. When the NC program transformation apparatus 1 determines that the controller 2 has finished one block, the coordinate position information corresponding to this block is stored in the coordinate position set and the coordinate position processing module 14 further determines whether a movement trace formed by this coordinate position set is a straight line. In step S301, when the coordinate position processing module 14 determines that the movement trace formed by this coordinate position set is a straight line, the method proceeds to step S303, wherein the coordinate position processing module 14 merely retains the last piece of the information and deletes the other information. In step S301, when the coordinate position processing module 14 determines that the movement trace formed by this coordinate position set is not a straight line, the method proceeds to step S305, where the coordinate position processing module 14 retains all information and stores it in the storage module 18. Therefore, the coordinate position processing module 14 may reduce the quantity of data to be stored in the storage module 16.

Figure 5:
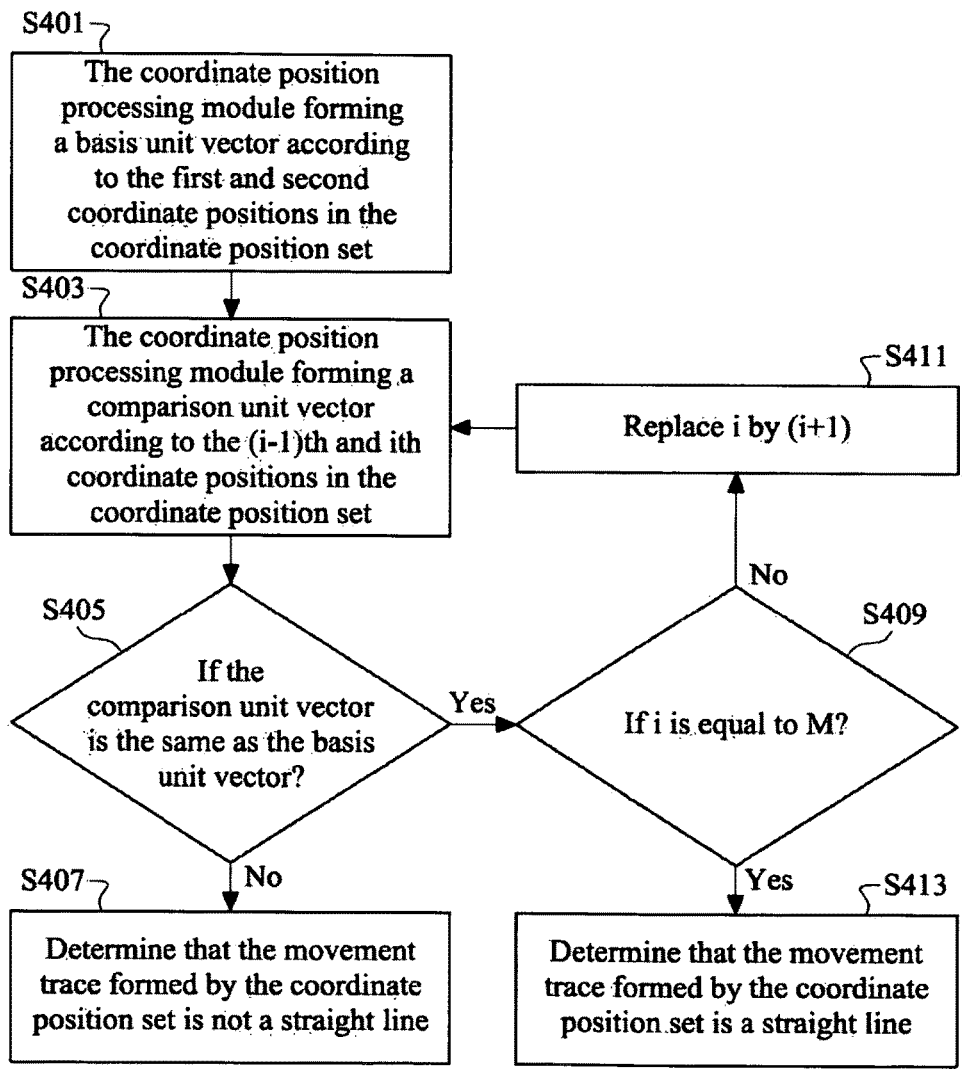
FIG. 5 is a detailed flow chart of determining whether a movement trace is a straight line, by the NC program transformation apparatus in an embodiment.

Please refer to FIG. 5 to illustrate how a NC program transformation apparatus determines whether a movement trace is a straight line in an embodiment. FIG. 5 is a detailed flow chart of determining whether a movement trace is a straight line, by the NC program transformation apparatus in an embodiment. As describe above, after the NC program transformation apparatus 1 determines that the controller 2 executes a block, the coordinate position processing module 14 further determines whether the movement trace formed by this coordinate position set is a straight line. In step S401, the coordinate position processing module 14, according to the first coordinate position and the second coordinate position in the coordinate position set, forms a basis unit vector. Then, in step S403, the coordinate position processing module 14, according to the (i−1)th coordinate position and the ith coordinate position in the coordinate position set, forms a comparison unit vector. In step S405, the coordinate position processing module 14 determines whether the comparison unit vector is the same as the basis unit vector. When the coordinate position processing module 14 determines that the comparison unit vector is different from the basis unit vector, the method proceeds to step S407, where the coordinate position processing module 14 determines that the movement trace formed by the coordinate position set is not a straight line. When the coordinate position processing module 14 determines that the comparison unit vector is the same as the basis unit vector, the method proceeds to step S409, where the coordinate position processing module 14 further determines whether i is equal to M. If yes, the method proceeds to step S413 where the coordinate position processing module 14 determines that the movement trace formed by the coordinate position set is a straight line. If no, the method proceeds to step S411 where the coordinate position processing module 14 replaces i by (i+1) and the method returns to step S403.

Figure 6:
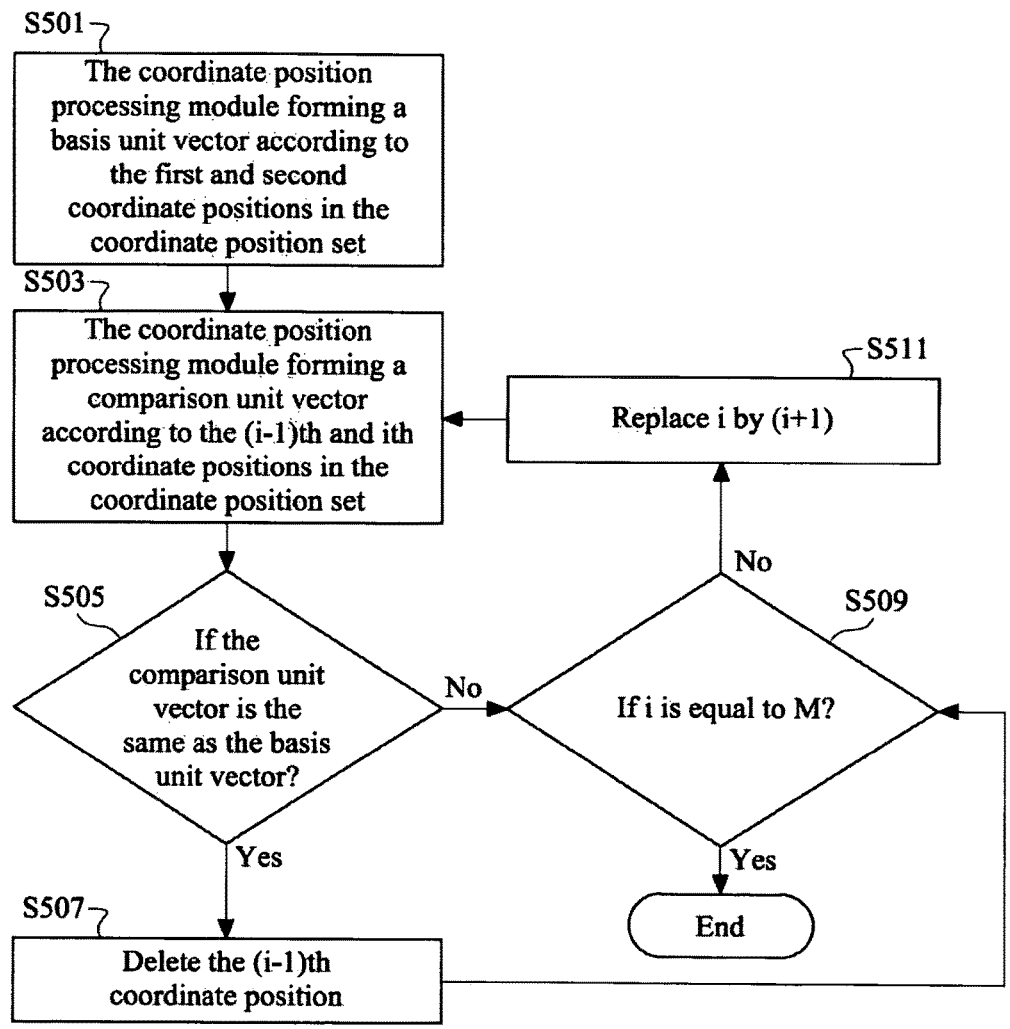
FIG. 6 is a flow chart of determining whether a fraction of the movement trace is a straight line, by the NC program transformation apparatus in an embodiment.

In practice, after executing one block of the NC program, the NC program transformation apparatus 1, according to the whole of the coordinate position set, determines whether the movement trace formed by the coordinate position information in a coordinate position set is a straight line, and after or when acquiring this coordinate position information, determines whether the movement trace formed by a fraction of the coordinate position information is a straight line. Please refer to FIG. 6. FIG. 6 is a flow chart of determining whether a fraction of the movement trace is a straight line, by the NC program transformation apparatus in an embodiment. In step S501, the coordinate position processing module 14, according to the first coordinate position and the second coordinate position in the coordinate position set, forms a basis unit vector. Then, in step S503, the coordinate position processing module 14, according to the (i−1)th coordinate position and the ith coordinate position in the coordinate position set, forms a comparison unit vector. In step S505, the coordinate position processing module 14 determines whether the comparison unit vector is the same as the basis unit vector. When the coordinate position processing module 14 determines that the comparison unit vector is different from the basis unit vector, the method proceeds to step S509. When the coordinate position processing module 14 determines that the comparison unit vector is the same as the basis unit vector, the method proceeds to step S507, where the coordinate position processing module 14 deletes information related to the (i−1)th coordinate position and replaces the current basis unit vector by the current comparison unit vector, and the method proceeds to step S509. In step S509, the coordinate position processing module 14 determines whether i is equal to M. If yes, the coordinate position processing module 14 ends this process. If not, the method proceeds to step S511, where the coordinate position processing module 14 replaces i by (i+1) and the method returns to step S503.

Figure 7:
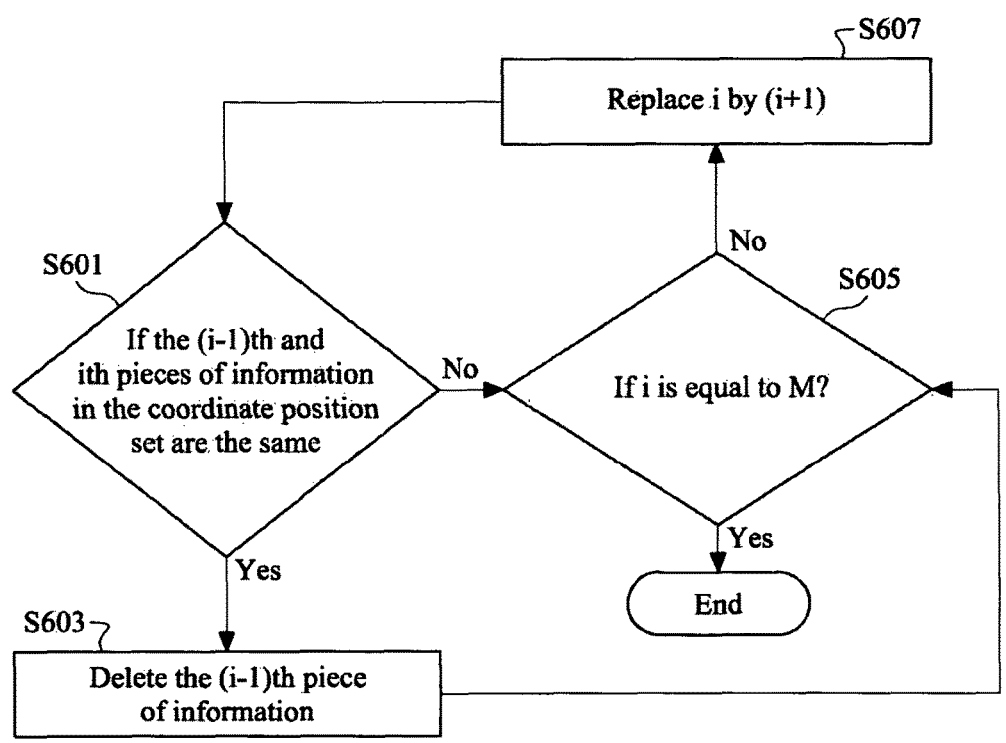
FIG. 7 is a flow chart of determining whether the cutting tool stops, by the NC program transformation apparatus in an embodiment.

In practice, the coordinate position processing module 14 detects errors occurring in information within the coordinate position set, to find out whether the cutting tool stops cutting the workpiece, and do something in response. Please refer to FIG. 7. FIG. 7 is a flow chart of determining whether the cutting tool stops, by the NC program transformation apparatus in an embodiment. In this embodiment, a multi-axis machine tool as the aforementioned machine uses its spindle and feed axes to move the cutting tool. In step S601, the coordinate position processing module 14 determines whether the (i−1)th pieces of information and the ith piece of information in the coordinate position set are the same. If yes, the method proceeds to step S603, where the coordinate position processing module 14 deletes the (i−1)th piece of information, and then the method proceeds to step S605. If not, the method directly proceeds to step S605. In step S605, the coordinate position processing module 14 determines whether i is equal to M. If not, the method proceeds to step S607, where the coordinate position processing module 14 replaces i by (i+1) and the method returns to step S601. If yes, the process ends. The determination process described with respect to FIG. 7 can follow step S211 in FIG. 2 in an embodiment, and in another embodiment, can follow step S209 in FIG. 2 after suitably being edited.

Figure 8A:
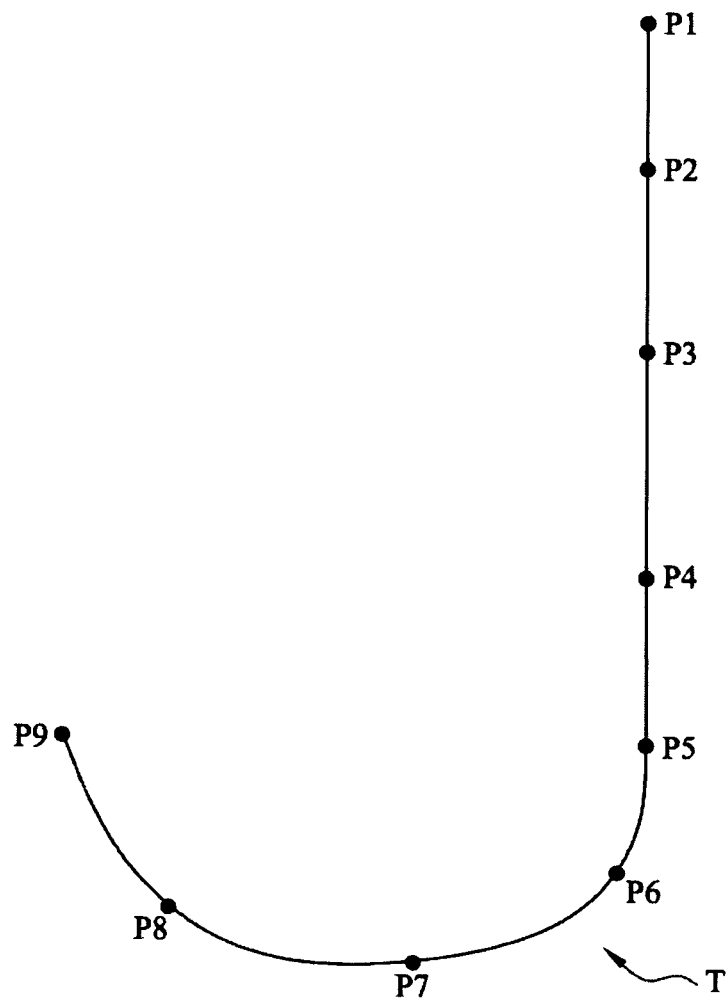
FIG. 8A is a flow chart of acquiring the coordinate position of the workpiece and the trace thereof by the NC program transformation apparatus in an embodiment.
Figure 8B:
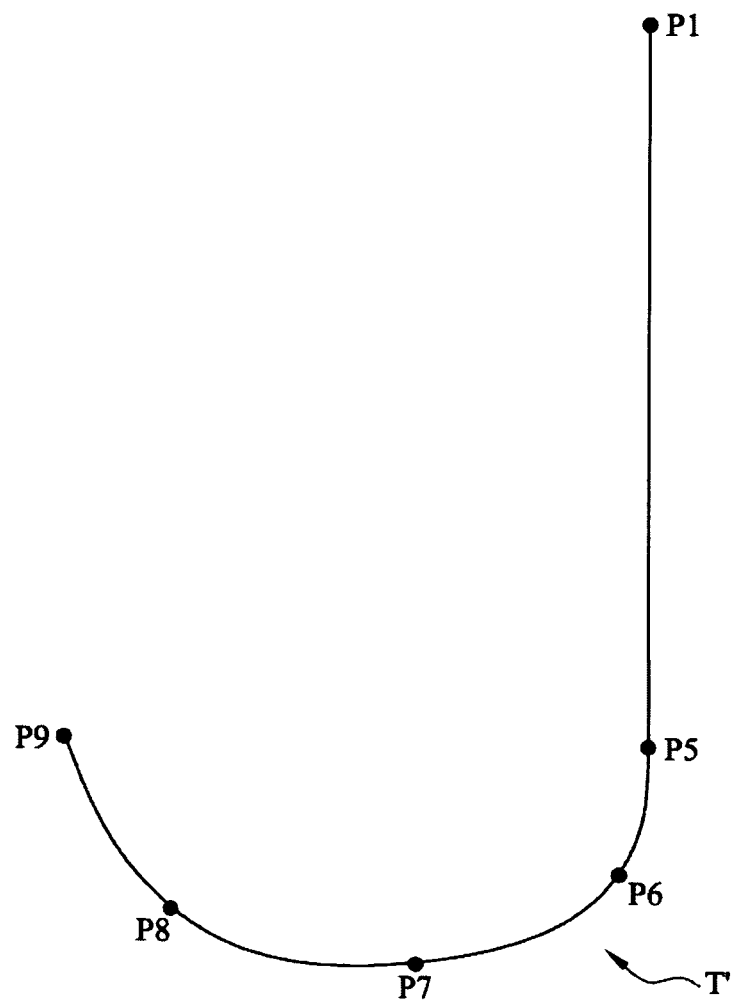
FIG. 8B is a flow chart of acquiring the coordinate position of the workpiece and the trace thereof by the NC program transformation apparatus in another embodiment.

Please refer to FIG. 8A and FIG. 8B. FIG. 8A is a flow chart of acquiring the coordinate position of the workpiece and the trace thereof by the NC program transformation apparatus in an embodiment, and FIG. 8B is a flow chart of acquiring the coordinate position of the workpiece and the trace thereof by the NC program transformation apparatus in another embodiment. As described in FIG. 8A, a workpiece movement trace or a cutting tool movement trace is represented by a trace T, which is substantially J-shaped. The coordinate position processing module 14 acquires coordinate points P1~P9 from the controller 2 in order. A fractional trace formed by the coordinate points P1~P5 is a straight line, and another fractional trace formed by the coordinate points P5~P9 is a curve. In this embodiment, the coordinate points P1~P9 have different intervals therebetween, and other embodiments may be contemplated. In an embodiment, the coordinate points P1~P9 correspond to the Xth block of the NC program. If the method as described in FIG. 5 is applied to this embodiment, the information about the coordinate points P1~P9 is stored in the storage module 18; if the method as described in FIG. 5 is applied to this embodiment, the information about the coordinate points P1 and P5~P9 is stored in the storage module 18 but the information about the coordinate points P2~P4 is deleted. In another embodiment, the coordinate points P1~P5 correspond to the Xth block of the NC program, and the coordinate points P6~P9 correspond to the (X+1)th block of the NC program. Herein, no matter that the method as described in FIG. 5 or 6 is applied to this embodiment, the information about the coordinate points P1 and P5~P9 is stored in the storage module 18 but the information about the coordinate points P2~P4 is deleted.

As set forth above, the disclosure employs a controller triggered to execute a NC program in a single block mode and meanwhile, acquires a plurality of coordinate information generated when the controller executes the NC program, in order to obtain a cutting tool trace conforming to an actual situation. Therefore, a NC program transformation apparatus provided in the disclosure can be applied to any brand of controller, and users have no need to write a different interpreter for a different brand of controller. Using such a NC program transformation apparatus may have no need to worry that the NC program has any self-defined macroinstruction or self-defined parameter, which is difficult to recognize. It may resolve the problems in obtaining cutting tool traces from a NC program in the past, and users may obtain cutting tool traces and related parameters more easily to check and perfect the cutting action of a cutting tool.

What is claimed is:

1. A NC program transformation apparatus electrically connected to a controller configured to execute a NC program to command a machine to drive a cutting tool to cut a workpiece, the NC program transformation apparatus comprising:
  a coordinate position processing module electrically connected to the controller;
  a triggering module electrically connected to the controller and the coordinate position processing module and configured to trigger the controller to execute blocks of the NC program in a single block mode for generating at least one set of coordinate positions corresponding to the executed blocks, and the blocks of the NC program configured to command the cutting tool to move to positions corresponding to the at least one set of coordinate positions in order, and the triggering module configured to trigger the coordinate position processing module to acquire the at least one set of coordinate positions generated by the controller;
  a storage module electrically connected to the coordinate position processing module and configured to store the at least one set of coordinate positions; and
  a determination module electrically connected to the controller and the coordinate position processing module and configured to determine whether the controller finishes the respective block, and command the coordinate position processing module to acquire the coordinate position generated by the controller when the controller finishes the respective block,
  wherein whenever the triggering module simultaneously sends a first triggering signal to the controller and a second triggering signal to the coordinate position processing module once, the controller is triggered to execute respective one of the blocks and generate the coordinate position corresponding to the executed block and the coordinate position processing module is triggered to acquire the coordinate position generated by the controller;
  wherein the coordinate position processing module further acquires a feed rate of the cutting tool from the controller and the feed rate of the cutting tool is stored in the storage module;
  wherein when one block in the NC program indicates M coordinate positions, the coordinate position processing module forms a basis unit vector according to an (i−2)th coordinate position and an (i−1)th coordinate position among the M coordinate positions and forms an ith comparison unit vector according to the (i−1)th coordinate position and an ith coordinate position among the M coordinate positions;

when the ith comparison unit vector is the same as the basis unit vector, the storage module does not store the (i−1)th coordinate position among the M coordinate positions; and M is a positive integer larger than 2, and i is a positive integer larger than 2 but not larger than M.

2. The NC program transformation apparatus according to claim 1, wherein the machine further uses a spindle and a plurality of feed axes to move the cutting tool.

3. The NC program transformation apparatus according to claim 2, wherein the machine is a multi-axis machine tool.

4. The NC program transformation apparatus according to claim 1, wherein the at least one set of coordinate positions indicated by each block of the NC program forms a coordinate position set; and when the coordinate position processing module determines that a trace formed by the coordinate position set is a straight line, the coordinate position processing module retains the last coordinate position and deletes the rest of coordinate positions among the coordinate position set.

5. The NC program transformation apparatus according to claim 1, wherein the at least one set of coordinate positions indicated by each block of the NC program forms a coordinate position set, and the coordinate position processing module sets the last coordinate position of a previous coordinate position set to be the first coordinate position of a current coordinate position set.

6. The NC program transformation apparatus according to claim 1, wherein the at least one set of coordinate positions indicated by each block of the NC program forms a coordinate position set; and when the coordinate position processing module determines that the coordinate position acquired currently and the coordinate position acquired previously in the coordinate position set are the same, the coordinate position processing module deletes the coordinate position acquired previously.

7. The NC program transformation apparatus according to claim 1, wherein the NC program is a numerical control code (NC code).

8. A NC program transformation method applied to a NC program transformation apparatus electrically connected to a controller configured to execute a NC program to command a machine to drive a cutting tool to cut a workpiece, the NC program transformation method comprising:

triggering the controller to execute respective blocks of the NC program in a single block mode, and the blocks of the NC program respectively commanding the cutting tool to move to positions corresponding to at least one set of coordinate positions in order;

determining whether the controller finishes the respective block;

acquiring the at least one set of coordinate positions generated by the controller when the controller finishes the respective block;

storing the at least one set of coordinate positions;

acquiring a feed rate of the cutting tool from the controller; and storing the feed rate of the cutting in a storage module, wherein whenever a first triggering signal and a second triggering signal are simultaneously provided once, the controller is triggered by the first triggering signal to execute respective one of the blocks and generate the coordinate position corresponding to the executed block and the coordinate position generated by the controller is acquired in response to the second triggering signal;

forming a basis unit vector according to an (i−2)th coordinate position and an (i−1)th coordinate position among M coordinate positions when one block of the NC program indicates the M coordinate positions;

forming an ith comparison unit vector according to the (i−1)th coordinate position and an ith coordinate position among the M coordinate positions; and not storing the (i-1)th coordinate position among the M coordinate positions in a storage module when the ith comparison unit vector is the same as the basis unit vector;

wherein M is a positive integer larger than 2, and i is a positive integer larger than 2 but not larger than M.

9. The NC program transformation method according to claim 8, wherein the machine further uses a spindle and a plurality of feed axes to move the cutting tool.

10. The NC program transformation method according to claim 9, wherein the machine is a multi-axis machine tool.

11. The NC program transformation method according to claim 8, wherein the at least one set of coordinate positions indicated by each block of the NC program forms a coordinate position set, and the NC program transformation method further comprises:

retaining the last coordinate position of the coordinate position set and deleting the rest of coordinate positions among the coordinate position set when the coordinate position processing module determines that a trace formed by the coordinate position set is a straight line.

12. The NC program transformation method according to claim 8, wherein the at least one set of coordinate positions indicated by each block of the NC program forms a coordinate position set, and the NC program transformation method further comprises:

setting the last coordinate position of a previous coordinate position set to be the first coordinate position of a current coordinate position set.

13. The NC program transformation method according to claim 8, wherein the at least one set of coordinate positions indicated by each block of the NC program forms a coordinate position set, and the NC program transformation method further comprises:

determining whether the coordinate position acquired currently and the coordinate position acquired previously in the coordinate position set are the same; and deleting the coordinate position acquired previously when the coordinate position acquired currently and the coordinate position acquired previously in the coordinate position set are the same.

14. The NC program transformation method according to claim 8, wherein the NC program is a numerical control code.

* * * * *